(12) United States Patent
Kim

(10) Patent No.: US 11,167,804 B2
(45) Date of Patent: Nov. 9, 2021

(54) VEHICLE BODY ASSEMBLY STRUCTURE

(71) Applicants: Hyundai Motor Company, Seoul (KR); Kia Motors Corporation, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/891,741

(22) Filed: Jun. 3, 2020

(65) Prior Publication Data
US 2021/0179182 A1    Jun. 17, 2021

(30) Foreign Application Priority Data
Dec. 17, 2019    (KR) .................. 10-2019-0168936

(51) Int. Cl.
| | | |
|---|---|---|
| *B62D 25/04* | (2006.01) | |
| *B62D 25/06* | (2006.01) | |
| *B62D 25/08* | (2006.01) | |
| *B62D 25/20* | (2006.01) | |

(52) U.S. Cl.
CPC ............ *B62D 25/04* (2013.01); *B62D 25/06* (2013.01); *B62D 25/081* (2013.01); *B62D 25/2036* (2013.01)

(58) Field of Classification Search
CPC .... B62D 25/04; B62D 25/06; B62D 25/2036; B62D 25/081; B62D 27/02; B62D 27/023; B62D 27/00

USPC .... 296/203.01–203.04, 193.07, 193.12, 205, 296/29, 30, 193.01–193.09, 210
See application file for complete search history.

(56) References Cited

U.S. PATENT DOCUMENTS

| | | | | |
|---|---|---|---|---|
| 2,389,907 | A * | 11/1945 | Helmuth ............. | B62D 23/005 296/203.01 |
| 2,668,722 | A * | 2/1954 | Muller ................. | B62D 23/005 280/792 |
| 4,355,844 | A * | 10/1982 | Muzzarelli ........... | B62D 23/005 280/784 |
| 4,618,163 | A * | 10/1986 | Hasler .................. | B62D 23/005 280/785 |
| 4,660,345 | A * | 4/1987 | Browning ............. | B62D 21/08 164/63 |
| 4,735,355 | A * | 4/1988 | Browning ............. | B62D 21/08 228/138 |
| 5,059,056 | A * | 10/1991 | Banthia .............. | A47B 47/0008 403/170 |

(Continued)

FOREIGN PATENT DOCUMENTS

KR    20140091510 A    7/2014

*Primary Examiner* — Dennis H Pedder
(74) *Attorney, Agent, or Firm* — Slater Matsil, LLP

(57) ABSTRACT

A vehicle body assembly structure includes a floor assembly including a floor, a front coupling portion provided at a front of the floor, and a rear coupling portion provided at a rear of the floor, and an upper assembly including a roof frame, a front mounting portion matched to the front coupling portion at a front of the roof frame, and a rear mounting portion matched to the rear coupling portion at a rear of the roof frame, wherein each of the front coupling portion and the front mounting portion and the rear coupling portion and the rear mounting portion are connected in a slide coupling structure.

20 Claims, 17 Drawing Sheets

(56) References Cited

U.S. PATENT DOCUMENTS

| | | | | |
|---|---|---|---|---|
| 5,092,649 A * | 3/1992 | Wurl | B62D 27/065 | 29/401.1 |
| 5,269,585 A * | 12/1993 | Klages | B62D 29/008 | 296/201 |
| 5,338,080 A * | 8/1994 | Janotik | B62D 23/005 | 280/785 |
| 5,458,393 A * | 10/1995 | Benedyk | B62D 23/005 | 296/203.01 |
| 5,794,398 A * | 8/1998 | Kaehler | B21C 37/29 | 29/421.1 |
| 5,839,777 A * | 11/1998 | Vlahovic | B62D 25/025 | 296/205 |
| 5,882,064 A * | 3/1999 | Emmons | B62D 21/12 | 296/193.04 |
| 6,116,680 A * | 9/2000 | Hunter | B62D 23/005 | 296/193.05 |
| 6,123,378 A * | 9/2000 | Teply | B62D 23/005 | 296/29 |
| 6,241,310 B1 * | 6/2001 | Patelczyk | B62D 23/005 | 296/203.01 |
| 6,282,790 B1 * | 9/2001 | Jaekel | B62D 23/005 | 29/897.2 |
| 6,302,478 B1 * | 10/2001 | Jaekel | B23K 26/38 | 296/205 |
| 6,409,254 B2 * | 6/2002 | Tiziano | B62D 23/00 | 296/190.03 |
| 6,412,857 B2 * | 7/2002 | Jaekel | B62D 23/005 | 296/205 |
| 6,533,348 B1 * | 3/2003 | Jaekel | B62D 21/12 | 296/205 |
| 6,598,923 B2 * | 7/2003 | Stol | B62D 23/005 | 296/29 |
| 6,619,715 B2 * | 9/2003 | Rackham | B62D 25/04 | 296/203.02 |
| 6,688,674 B2 * | 2/2004 | Sato | B23K 26/0838 | 296/185.1 |
| 7,503,623 B2 * | 3/2009 | Favaretto | B62D 23/005 | 280/798 |
| 8,272,682 B2 * | 9/2012 | Cimatti | B62D 25/04 | 296/204 |
| 8,424,912 B2 * | 4/2013 | Favaretto | B62D 29/008 | 280/781 |
| 8,641,133 B1 * | 2/2014 | Scaringe | B62D 29/008 | 296/193.03 |
| 9,884,663 B2 * | 2/2018 | Czinger | B62D 65/02 | |
| 9,975,179 B2 * | 5/2018 | Czinger | B62D 21/17 | |
| 10,029,736 B1 * | 7/2018 | Arora | B62D 25/06 | |
| 10,501,127 B2 * | 12/2019 | Passone | B62D 33/04 | |
| 10,668,965 B2 * | 6/2020 | Czinger | B62D 65/02 | |
| 10,960,468 B2 * | 3/2021 | Czinger | B62D 27/023 | |
| 10,960,929 B2 * | 3/2021 | Czinger | B62D 27/023 | |
| 2007/0246972 A1 * | 10/2007 | Favaretto | B62D 23/005 | 296/205 |
| 2010/0181804 A1 * | 7/2010 | Malvino | B62D 27/023 | 296/205 |
| 2021/0053698 A1 * | 2/2021 | Hoeper | B60Q 1/0088 | |

* cited by examiner

VEHICLE BODY ASSEMBLY STRUCTURE

CROSS-REFERENCE TO RELATED APPLICATIONS

This application claims priority to Korean Patent Application No. 10-2019-0168936, filed on Dec. 17, 2019, which application is hereby incorporated herein by reference.

TECHNICAL FIELD

The present disclosure relates to a vehicle body assembly structure.

BACKGROUND

Pillars of vehicles are classified as a front pillar, a center pillar, and a rear pillar according to positions of the pillars and play an important role for improving rigidity and safety of vehicle bodies, as well as supporting roofs of the vehicles.

A pillar of a related art, as a structure in which a plurality of mold parts are combined in designing a monocoque type, has excellent rigidity but is almost impossible as a design part to implement in vehicles of various designs or to be commonly used for each segment.

Of course, in the existing monocoque structure, the entire front pillar may be designed by a DRAW mold of one inner member and outer member but is rarely extendible for connection with other parts and a new mold needs to be developed by design for each model.

That is, a significant design change may be required in case of small quantity batch production or production through a smart factory, and as a result, the number of molds is inevitably remarkably increased to increase a production cost.

Therefore, there is a need for a vehicle body having a new structure or a pillar structure that may ensure rigidity and extendibility for connection with other components, while overcoming disadvantages of the related art.

The contents described as the related art have been provided only to assist in understanding the background of the present disclosure and should not be considered as corresponding to the related art known to those having ordinary skill in the art.

SUMMARY

The present disclosure relates to a vehicle body assembly structure. Particular embodiments relate to a connection structure for separating a vehicle body into an upper part and a lower part and connecting the separated upper part and lower part.

An embodiment of the present disclosure provides a vehicle body assembly structure in which a vehicle body is separated into an upper part and a lower part and each of the separated parts are connected by a connection structure of a pillar, whereby each part may be easily, commonly used and applied according to various vehicle types and models, thus ensuring assemblability of components and improving strength and rigidity of the components.

According to an embodiment of the present disclosure, a vehicle body assembly structure includes a floor assembly including a floor, a front coupling portion provided at a front of the floor, and a rear coupling portion provided at a rear of the floor, and an upper assembly including a roof frame, a front mounting portion matched to the front coupling portion at a front of the roof frame, and a rear mounting portion matched to the rear coupling portion at a rear of the roof frame, wherein each of the front coupling portion and the front mounting portion and the rear coupling portion and the rear mounting portion are connected in a slide coupling structure.

The front coupling portion may include a lower pillar member extending in an up-down direction at the front of the floor and a middle member coupled to the lower pillar member and extending forward, the front mounting portion may include a middle member upper coupled to the front of the roof frame and extending forward along the middle member, and the middle member and the middle member upper may be connected in a slide coupling structure with respect to a front-rear direction.

A first lower coupling portion may be provided at an upper end of the middle member, and a first upper coupling portion engaged with and slidably coupled to the first lower coupling portion may be provided at a lower end of the middle member upper.

One of the first upper coupling portion and the first lower coupling portion may be a protrusion having a polygonal, circular, or T-shaped cross-sectional shape, and the other may be a recess slidably coupled to the corresponding protrusion.

A panel portion extending upward from a side end may be provided at the upper end of the middle member, the first lower coupling portion may be provided toward the middle member upper at the upper end of the middle member and at the panel portion, and the first upper coupling portion engaged with the first lower coupling portion provided at each of the upper end of the middle member and at the panel portion may be provided at the lower end of the middle member upper and a side end thereof facing the panel portion.

A fastening end portion in which the first upper coupling portion is provided may protrude from each of the lower end of the middle member upper and the side end thereof facing the panel portion, and a support end portion protruding to fill a space between the fastening end portions in a state where the first upper coupling portion of the middle member upper is engaged with the first lower coupling portion may be provided at the upper end of the middle member.

A front portion of the roof frame may be coupled with an inclination at an upper portion of the middle member upper, and a support member coupling the front portion of the roof frame and the middle member upper may be provided between the front portion of the roof frame and the middle member upper.

The floor assembly may further include a dash panel upper member extending in a transverse direction of the vehicle and connected to the lower pillar member, and the upper assembly may further include a cowl member extending in the transverse direction of the vehicle at a front portion of the roof frame and a cowl panel whose upper end is connected to the cowl member and lower end is connected to the dash panel upper member.

A coupling portion bent forward and coupled to an upper end of the dash panel upper member may be provided at a lower end of the cowl panel, and the coupling portion may extend forward with an inclination upward.

The rear coupling portion may include a vertical member extending in the up-down direction from the rear of the floor and a horizontal member coupled to the vertical member and extending in a front-rear direction, the rear mounting portion may include a connection member coupled to the rear of the roof frame and extending in the front-rear direction along the horizontal member, and the horizontal member and the connection member may be connected in a slide coupling structure with respect to the front-rear direction.

A second lower coupling portion may be provided at an upper end of the horizontal member and a second upper coupling portion engaged to be slidably coupled with the second lower coupling portion may be provided at a lower end of the connection member.

One of the second upper coupling portion and the second lower coupling portion may be a protrusion having a polygonal, circular, or T-shaped cross-sectional shape, and the other may be a recess slidably coupled to the corresponding protrusion.

The second upper coupling portion may be configured as a plurality of recesses and the second lower coupling portion may be configured as a plurality of protrusions inserted into the plurality of recesses.

The floor assembly may include a pillar coupling portion provided between the front coupling portion and the rear coupling portion at the floor, the upper assembly may include a pillar mounting portion provided between the front mounting portion and the rear mounting portion at the roof frame, and a center pillar member extending in an up-down direction may be coupled to the pillar coupling portion and the pillar mounting portion.

The lower pillar member and the middle member of the front coupling portion and the roof frame and the middle member upper of the front mounting portion may be enclosed in an inner cover bracket so as to be fixed together.

The front coupling portion may include a lower pillar member extending in an up-down direction on the front of the floor, the front mounting portion may include a middle member coupled to the roof frame and extending in a front-rear direction from a lower portion of the roof frame, and the lower pillar member and the middle member may be coupled in a slide structure in the up-down direction when assembled.

The lower pillar member, the middle member, and the roof frame may be enclosed in an inner cover bracket and fixed together.

A first lower coupling portion may be provided at a front end of the lower pillar member, and a first upper coupling portion engaged with and slidably coupled to the first lower coupling portion may be provided at a rear end of the middle member.

The rear coupling portion may include a vertical member extending in an up-down direction at the rear of the floor and a horizontal member coupled to the vertical member and extending in a front-rear direction, the rear mounting portion may include a coupling member coupled to the rear of the roof frame and extending downward along the vertical member, and the vertical member and the coupling member may be connected in the up-down direction in the slide coupling structure.

A second lower coupling portion may be provided at the vertical member, and a second upper coupling portion engaged with and slidably coupled to the second lower coupling portion may be provided at the coupling member.

DETAILED DESCRIPTION OF ILLUSTRATIVE EMBODIMENTS

Hereinafter, a vehicle body assembly structure according to embodiments of the present disclosure will be described with reference to the accompanying drawings.

Figure 1:
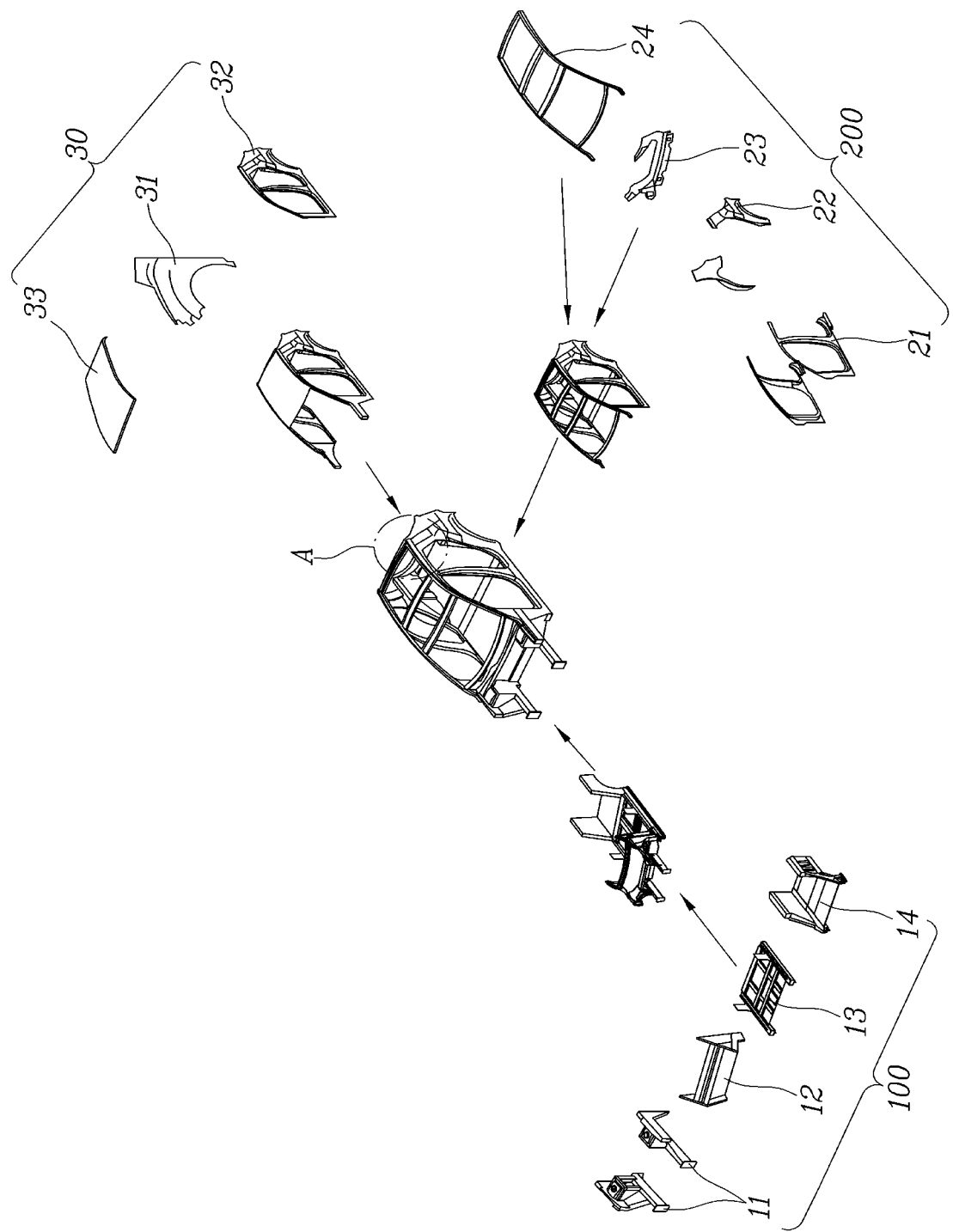
FIG. 1 is a view illustrating a vehicle body assembly structure according to embodiments of the present disclosure.
Figure 2:
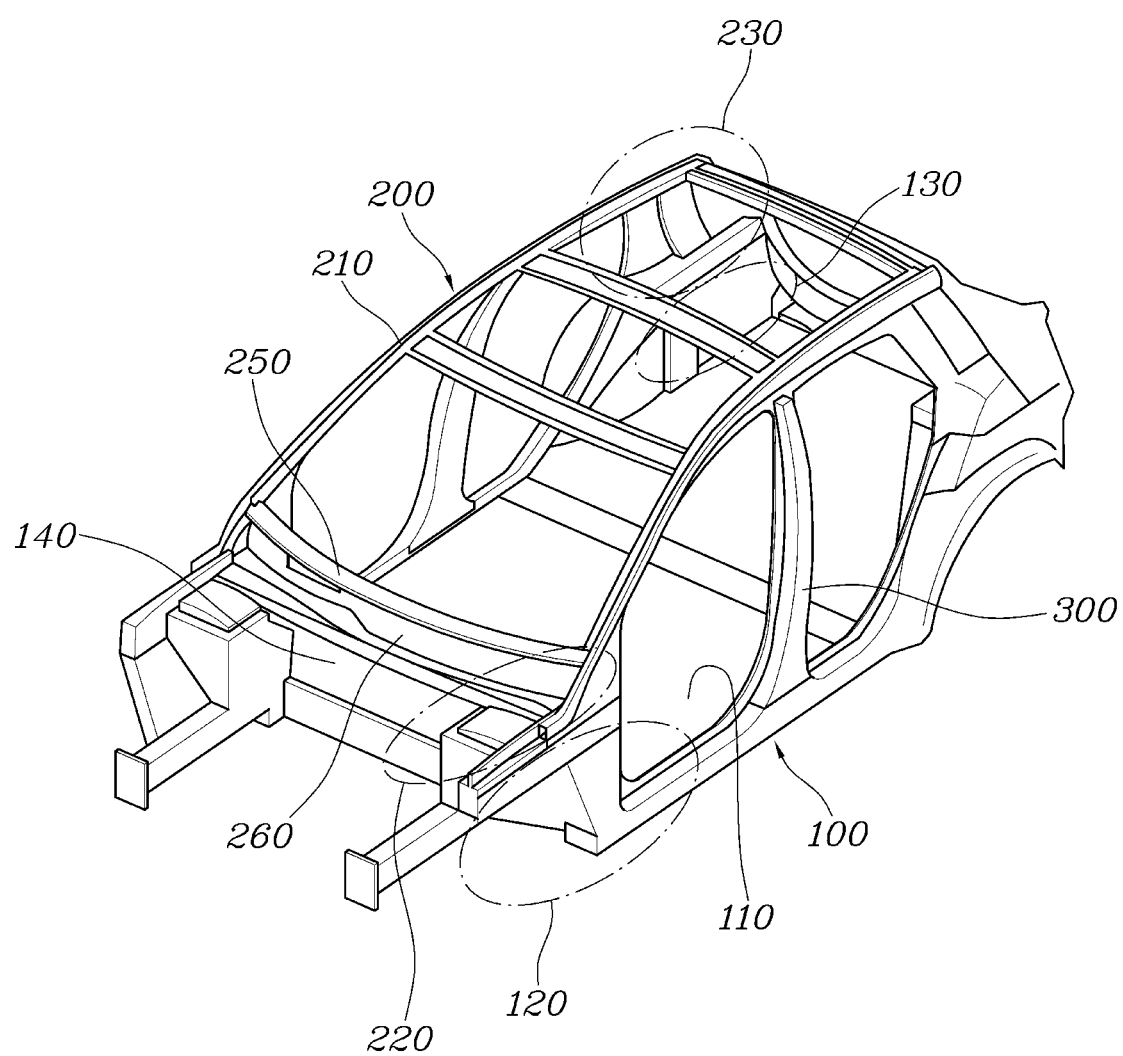
FIG. 2 is an assembly view of a floor assembly and an upper assembly of the vehicle body assembly structure illustrated in FIG. 1.
Figure 7:
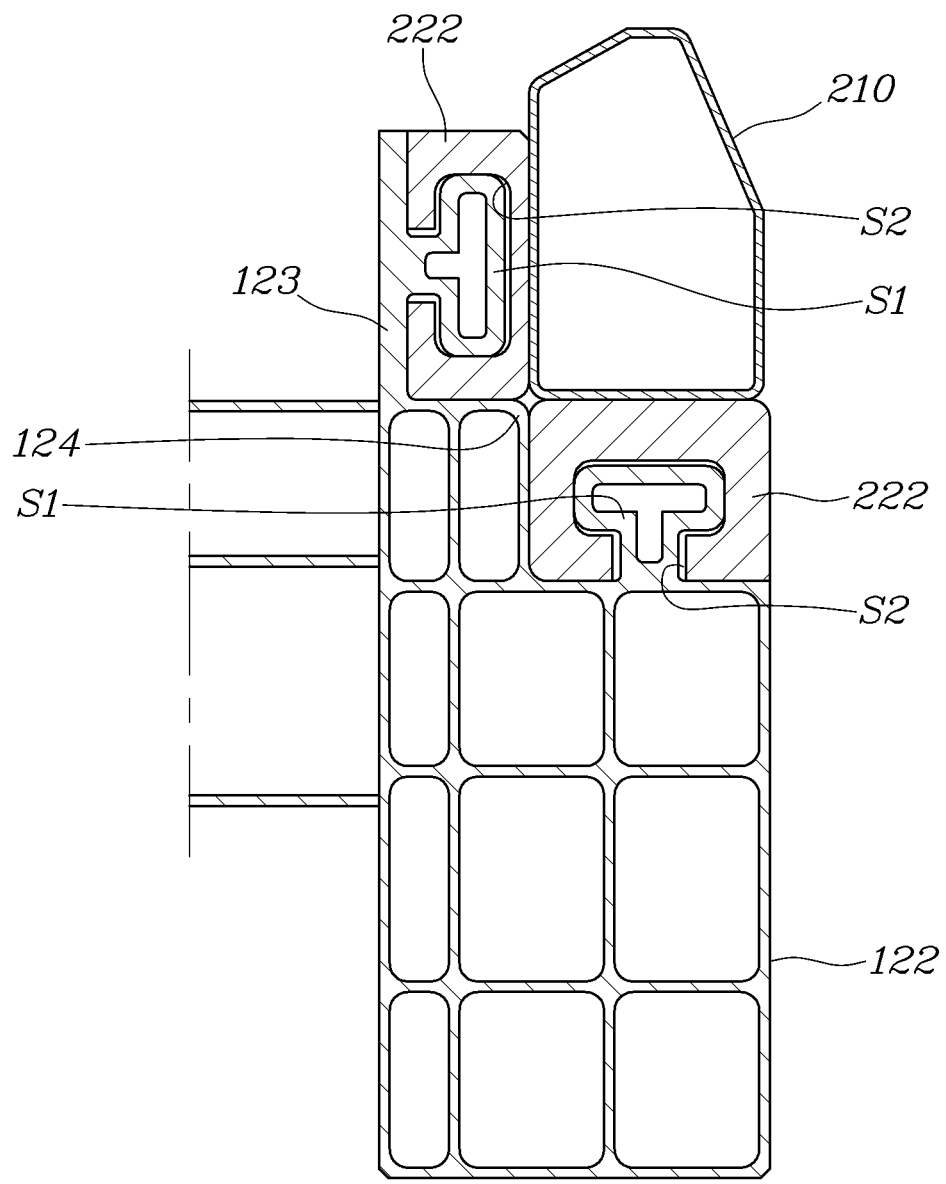
FIG. 7 is a view illustrating an embodiment of a first lower coupling portion and a first upper coupling portion according to the floor assembly and the upper assembly illustrated in FIG. 2.
Figure 8:
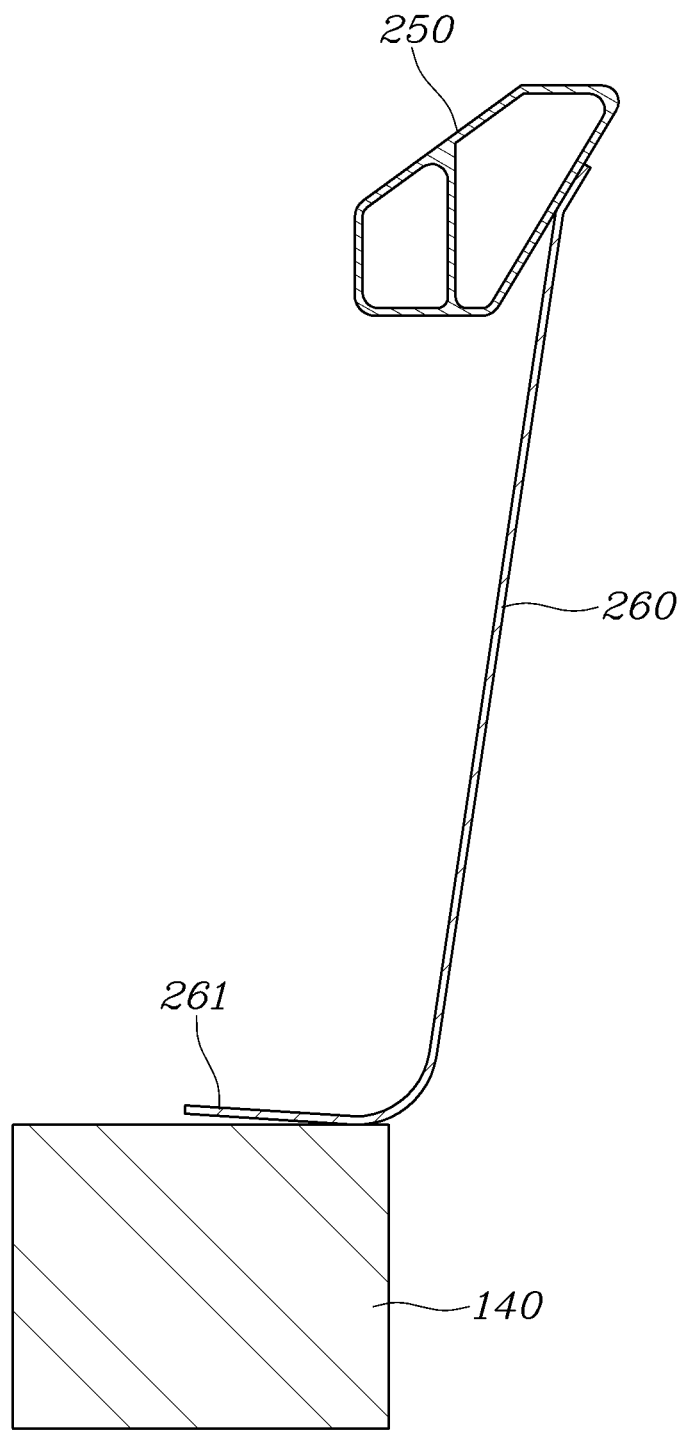
FIG. 8 is a view illustrating a dash panel upper member connection structure of the floor assembly and the upper assembly illustrated in FIG. 2.
Figure 9:
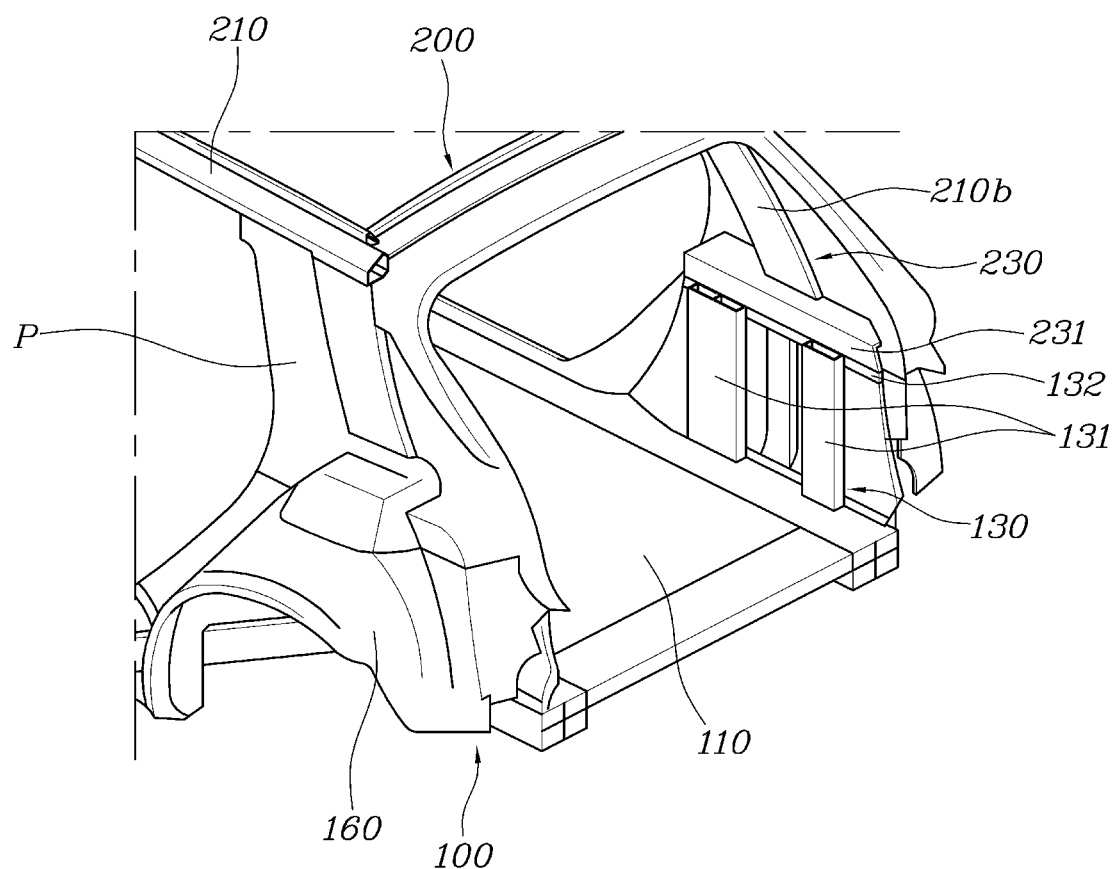
FIG. 9 is a view for explaining the assembly structure of the floor assembly and the upper assembly illustrated in FIG. 2.
Figure 10:
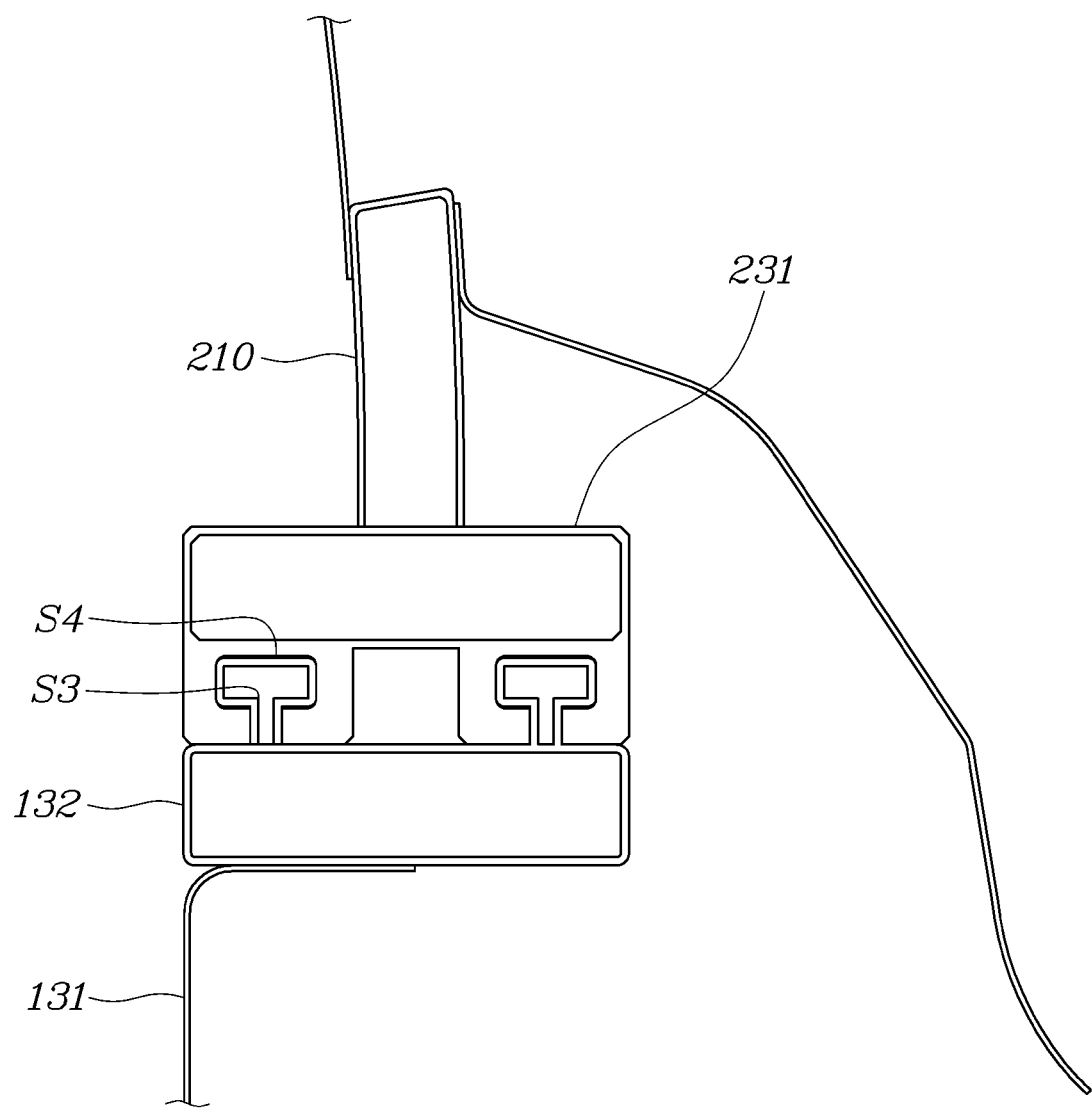
FIG. 10 is a view illustrating an embodiment of a second lower coupling portion and a second upper coupling portion according to the floor assembly and the upper assembly illustrated in FIG. 2.
Figure 11:
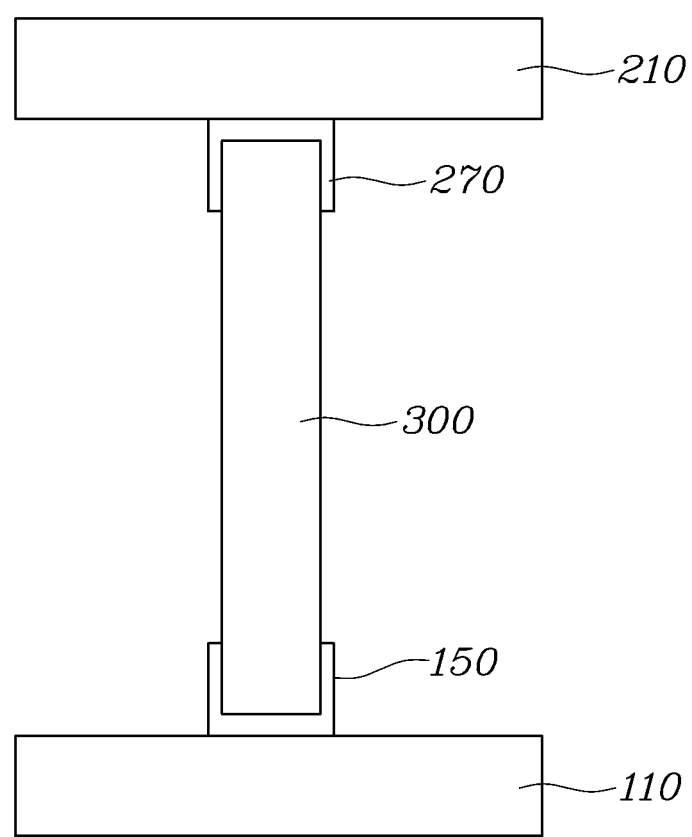
FIG. 11 is a view illustrating a center pillar member connection structure of the floor assembly and the upper assembly illustrated in FIG. 2.

FIG. 1 is a view illustrating a vehicle body assembly structure according to embodiments of the present disclosure, FIG. 2 is an assembly view of a floor assembly and an upper assembly of the vehicle body assembly structure illustrated in FIG. 1, FIGS. 3 to 6 are views illustrating an assembly structure of the floor assembly and the upper assembly illustrated in FIG. 2, FIG. 7 is a view illustrating an embodiment of a first lower coupling portion and a first upper coupling portion according to the floor assembly and the upper assembly illustrated in FIG. 2, FIG. 8 is a view illustrating a dash panel upper member connection structure of the floor assembly and the upper assembly illustrated in FIG. 2, FIG. 9 is a view for explaining the assembly structure of the floor assembly and the upper assembly illustrated in FIG. 2, FIG. 10 is a view illustrating an embodiment of a second lower coupling portion and a second upper coupling portion according to the floor assembly and the upper assembly illustrated in FIG. 2, and FIG. 11 is a view illustrating a center pillar member connection structure of the floor assembly and the upper assembly illustrated in FIG. 2.

Embodiments of the present disclosure relate to a modularized vehicle body. For example, as illustrated in FIG. 1, in configuring a vehicle body, a front apron assembly 11, a dash assembly 12, a center floor assembly 13, and a rear floor assembly 14 may configure a floor assembly 100, a front side assembly 21, a rear side assembly 22, a back assembly 23, and a roof assembly 24 may configure an upper assembly 200, the floor assembly 100 and the upper assembly 200 may be assembled, and in this state, a skin assembly 30 including a fender 31, a side outer 32, and a roof panel 33 may be coupled to form the modularized vehicle body.

The modularized vehicle body described above is an embodiment which is merely for helping understanding of the modularized vehicle body and an assembly order and each component may be modified when the vehicle body is actually formed.

Embodiments of the present disclosure relate to a connection structure of the floor assembly 100 and the upper assembly 200, and the floor assembly 100 and the upper assembly 200 may be easily modified and applied according to various vehicle types and models.

Accordingly, a shape of each member configuring the floor assembly 100 and the upper assembly 200 may be changed, and other components connected thereto may be adjusted in shape or size thereof. As a result, a vehicle body suitable for various vehicle types and models may be developed, and thus a new vehicle type may be easily developed and may be effectively applied to a small-quantity-batch-production method.

As illustrated in FIG. 2, the vehicle body assembly structure according to embodiments of the present disclosure includes the floor assembly 100 including a floor 110, a front coupling portion 120 provided at a front of the floor 110, and a rear coupling portion 130 provided at a rear of the floor 110, and an upper assembly 200 including a roof frame 210, a front mounting portion 220 matched to the front coupling portion 120 at a front of the roof frame 210 and a rear mounting portion 230 matched to the rear coupling portion 130 at a rear of the roof frame 210, wherein each of the front coupling portion 120 and the front mounting portion 220 and the rear coupling portion 130 and the rear mounting portion 230 are connected in a slide coupling structure.

As such, in embodiments of the present disclosure, the floor assembly 100 and the upper assembly 200 are separately configured and coupled by a slide coupling structure, thereby ensuring assemblability and coupling rigidity.

The floor assembly 100 has the floor 110, the front coupling portion 120 provided at the front of the floor 110, and the rear coupling portion 130 provided at the rear of the floor 11o. Here, the front apron assembly 11 may be assembled to the front coupling portion 120 of the floor assembly 100, and a wheel may be mounted on the rear coupling portion 130.

The upper assembly 200 has the roof frame 210, the front mounting portion 220 provided at the front of the roof frame 210, and the rear mounting portion 230 provided at the rear of the roof frame 210. Here, the front mounting portion 220 corresponds to an A pillar of the roof frame 210 and is matched to the front coupling portion 120 of the floor assembly 100, and the rear mounting portion 230 corresponds to a C pillar of the roof frame 210 and is matched to the rear coupling portion 130 of the floor assembly 100.

In particular, each of the front coupling portion 120 and the front mounting portion 220 and the rear coupling portion 130 and the rear mounting portion 230 are configured to be assembled to a slide coupling structure, the floor assembly 100 and the upper assembly 200 are coupled to each other by sliding the upper assembly 200 with respect to the floor assembly 100.

As such, since the floor assembly 100 and the upper assembly 200 are separately configured, the floor assembly 100 and the upper assembly 200 may be modified according to vehicle types and models, and since the floor assembly 100 and the upper assembly 200 are coupled by a slide coupling structure, assembling may be facilitated and coupling rigidity may be ensured.

Figure 3:
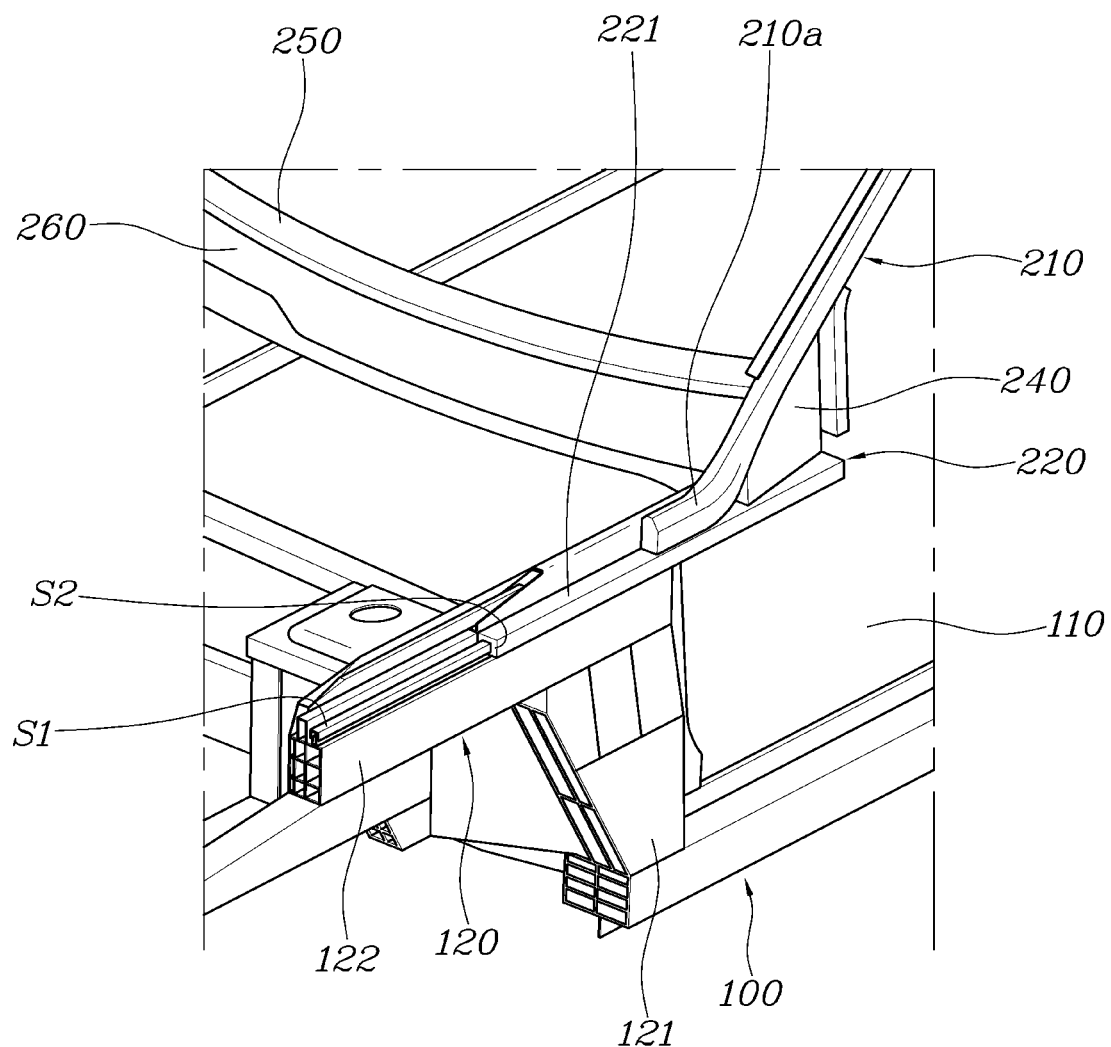
FIGS. 3 to 6 are views illustrating an assembly structure of the floor assembly and the upper assembly illustrated in FIG. 2.
Figure 4:
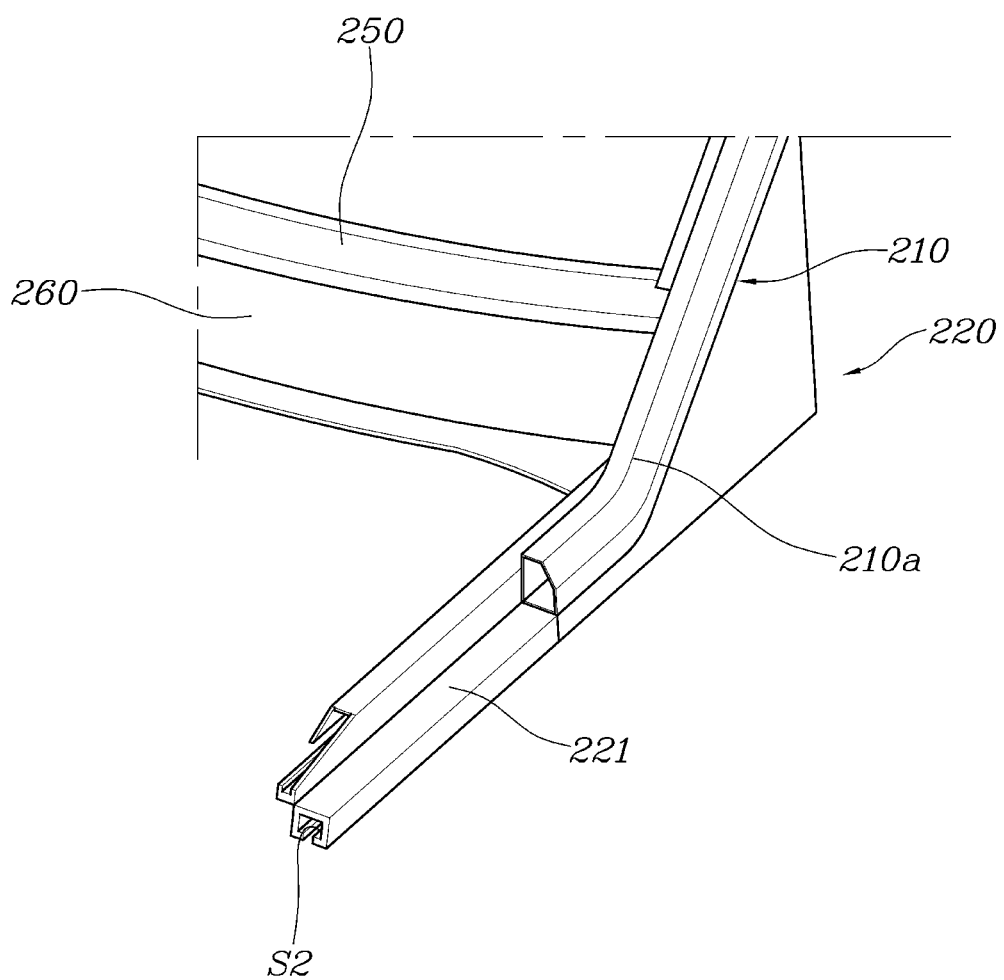
Figure 5:
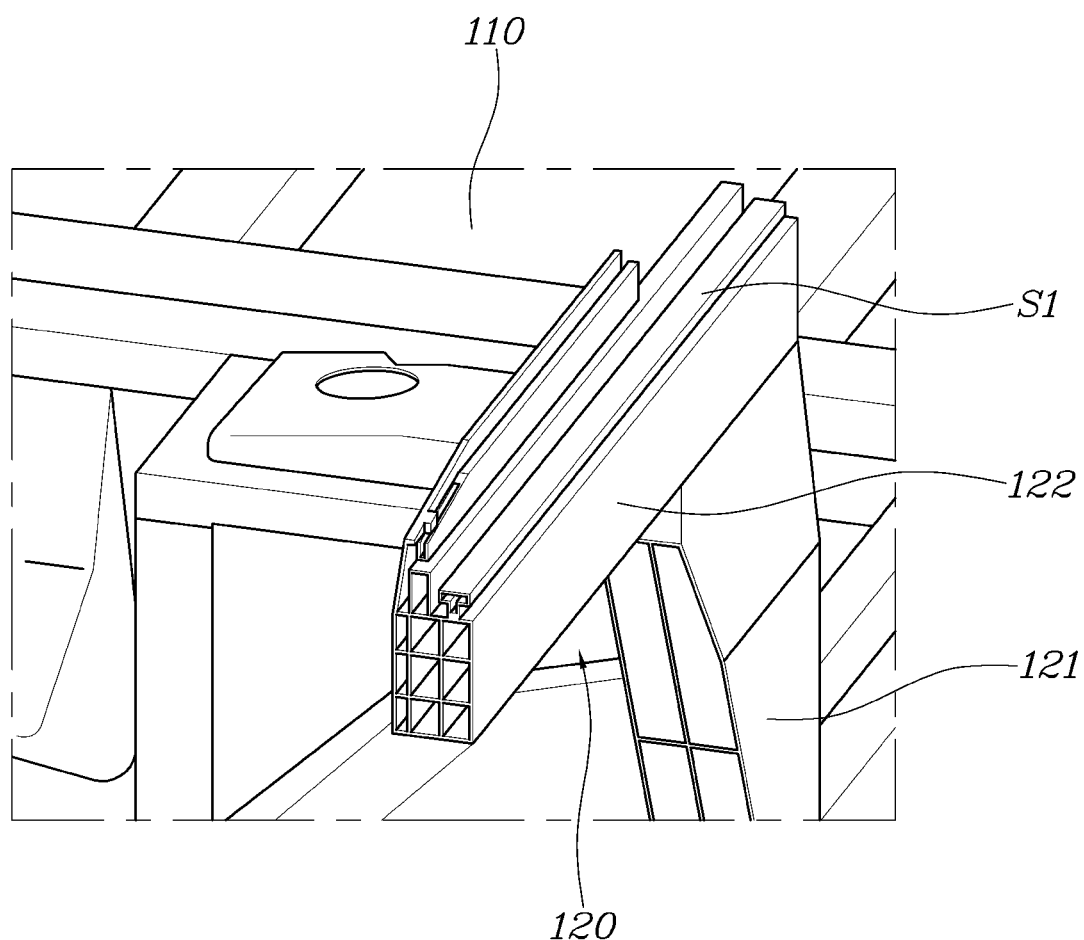
Figure 6:
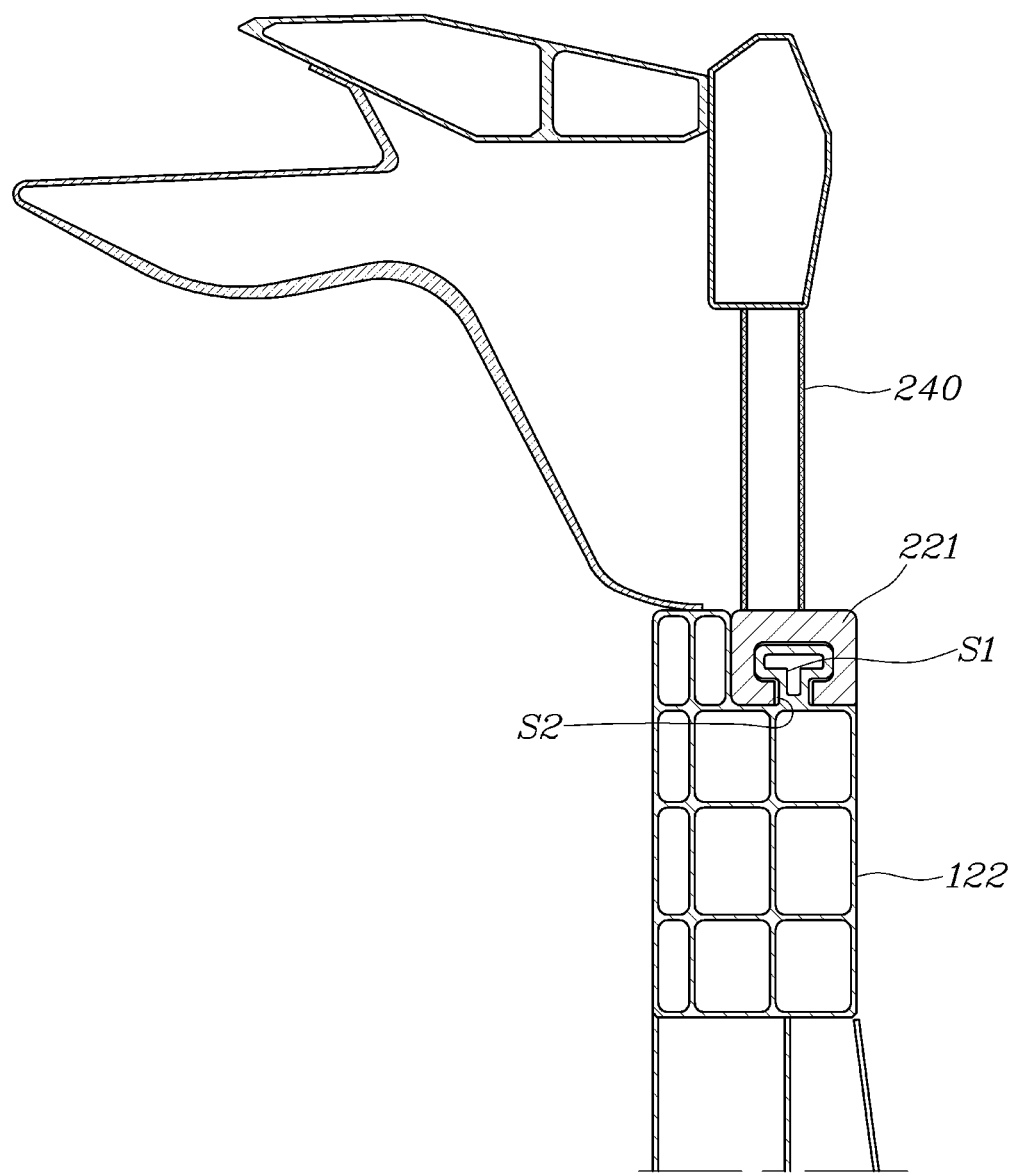

Specifically, as illustrated in FIGS. 3 through 5, the front coupling portion 120 includes a lower pillar member 121 extending in an up-down direction at the front of the floor 110 and a middle member 122 coupled to the lower pillar member 121 and extending forward, and the front mounting portion 220 includes a middle member upper 221 coupled to the front of the roof frame 210 and extending forward along the middle member 122. The middle member 122 and the middle member upper 221 may be connected in a slide coupling structure with respect to a front-rear direction.

Here, the lower pillar member 121, the middle member 122, and the middle member upper 221 may have a hollow closed cross-sectional structure to form a space frame structure.

The lower pillar member 121 extends in the up-down direction on the front of the floor 110 to support each component including the upper assembly 200, and the middle member 122 is connected to the front apron assembly 11 and the roof assembly 24. Meanwhile, the front mounting portion 220 provided at the roof assembly 24 includes the middle member upper 221, and the middle member upper 221 extends forward along the middle member 122.

As such, since the middle member 122 of the front coupling portion 120 and the middle member upper 221 of the front mounting portion 220 extend in the front-rear direction and are interconnected in the slide coupling structure with respect to the front-rear direction, front portions of the floor assembly 100 and the upper assembly 200 may be assembled to each other.

Specifically, as illustrated in FIGS. 3 through 6, a first lower coupling portion S1 is provided at an upper end of the middle member 122, and a first upper coupling portion S2 engaged with and slidably coupled to the first lower coupling portion S1 is provided at a lower end of the middle member upper 221. FIG. 3 illustrates a state before the floor assembly 100 and the upper assembly 200 are completely coupled to each other.

That is, the upper end of the middle member 122 and the lower end of the middle member upper 221 may be coupled by the medium of the first lower coupling portion S1 and the first upper coupling portion S2, respectively, and the first lower coupling portion S1 and the first upper coupling portion S2 are engaged with each other and slide in the front-rear direction so as to be coupled with each other.

Accordingly, one of the first upper coupling portion S2 and the first lower coupling portion S1 may be a protrusion having a polygonal, circular, or T-shaped cross-sectional shape, and the other may be a recess slidably coupled to the corresponding protrusion.

In this manner, the first upper coupling portion S2 and the first lower coupling portion S1 are matched to each other, and since the cross-sectional shape is the polygonal, circular, or T-shape, movement is allowed only in the front-rear direction and is restricted in the other directions. In the embodiments of the present disclosure, the first upper coupling portion S2 and the first lower coupling portion S1 are assumed to have a T shape.

Accordingly, by matching and sliding the first upper coupling portion S2 of the middle member upper 221 in the front-rear direction with respect to the first lower coupling portion S1 of the middle member 122, the floor assembly 100 and the upper assembly 200 may be assembled to each other in a slide structure.

As another embodiment, as illustrated in FIG. 7, a panel portion 123 extending upward from a side end is provided at the upper end of the middle member 122, the first lower coupling portion S1 may be provided toward the middle member upper 221 at the upper end of the middle member 122 and at the panel portion 123, and the first upper coupling portion S2 engaged with the first lower coupling portion S1 provided at each of the upper end of the middle member 122 and at the panel portion 123 may be provided at the lower end of the middle member upper 221 and a side end thereof facing the panel portion 123.

In this manner, since the panel portion 123 is further provided at the upper end of the middle member 122, the middle member upper 221 seated on the middle member 122 may be surrounded by the upper end of the middle member 122 and the panel portion 123. Here, since the first lower coupling portion S1 is provided toward the middle member upper 221 at the upper end of the middle member 122 and at the panel portion 123, and the first upper coupling portion S2 is provided at a portion of the middle member upper 221 facing the upper end of the middle member 122 and the panel portion 123, the middle member 122 and the middle member upper 221 have a plurality of coupling points by the medium of a plurality of the first lower coupling portions S1 and the first upper coupling portions S2.

Accordingly, coupling rigidity of the middle member 122 and the middle member upper 221 may be increased. When the middle member 122 and the middle member upper 221 are slidably coupled to each other, the first lower coupling portion S1 and the first upper coupling portion S2 may be accurately engaged to perform a smooth sliding operation.

In addition, a fastening end portion 222 in which the first upper coupling portion S2 is provided protrudes from each of a lower end of the middle member upper 221 and a side end facing the panel portion 123, and a support end portion 124 protruding to fill a space between the fastening end portions 222 in a state where the first upper coupling portion S2 of the middle member upper 221 is engaged with the first lower coupling portion S1 so as to be coupled may be provided at the upper end of the middle member 122. Accordingly, the first upper coupling portion S2 may be configured as a recess and the first lower coupling portion S1 may be configured as a protrusion.

In this manner, since the fastening end portion 222 protrudes from each of the lower end and the side end of the middle member upper 221, and the first upper coupling portion S2 is provided at the fastening end portion 222, a degradation of rigidity of the middle member upper 221 due to the first upper coupling portion S2 configured as a recess is prevented. In addition, since the support end portion 124 filling the space generated as the fastening end portion 222 is provided at the middle member upper 221 and the upper end of the middle member 122, the fastening end portion 222 of the middle member upper 221 is in contact with the support end portion 124.

Accordingly, since the fastening end portion 222 is supported in contact with the support end portion 124 of the middle member 122, support strength of the middle member upper 221 may be ensured and coupling rigidity between the middle member upper 221 and the middle member 122 is improved.

Meanwhile, as illustrated in FIGS. 3 through 5, a front portion 210a of the roof frame 210 is coupled with an inclination at the upper portion of the middle member upper 221, and a support member 240 coupling the front portion 210a of the roof frame 210 and the middle member upper 221 may be provided between the front portion 210a of the roof frame 210 and the middle member upper 221.

That is, the roof frame 210 is coupled with an inclination to the upper portion of the middle member upper 221 according to a shape of the vehicle body. Accordingly, a space is formed between the front portion 210a of the roof frame 210 and the middle member upper 221, and since the support member 240 is provided to fill the space, support rigidity and coupling strength of the roof frame are ensured.

The support member 240 may be provided to match in the form of the space between the front portion 210a of the roof frame 210 and the middle member upper 221 and may have a closed cross-sectional structure to ensure its own rigidity.

Meanwhile, as illustrated in FIGS. 2 and 8, the floor assembly 100 may further include a dash panel upper member 140 extending in a transverse direction of the vehicle and connected to the lower pillar member 121, and the upper assembly 200 may further include a cowl member 250 extending in the transverse direction of the vehicle at the front portion 210a of the roof frame 210 and a cowl panel 260 whose upper end is connected to the cowl member 250 and lower end is connected to the dash panel upper member 140.

In this manner, the floor assembly 100 further includes the dash panel upper member 140, the upper assembly 200 further includes the cowl member 250 extending in the transverse direction of the vehicle at the front portion 210a of the roof frame 210, and the cowl member 250 and the dash panel upper member 140 are connected to each other through the cowl panel 260. That is, the dash panel upper member 140 for partitioning an engine room and the interior of the vehicle is provided, and the cowl member 250 and the cowl panel 260 forming a connection structure with the dash panel upper member 140 is provided, thus configuring the front of the body.

Accordingly, when the floor assembly 100 and the upper assembly 200 are assembled to each other, the cowl panel 260 is in contact with the dash panel upper member 140 to form a sealed structure for the front and rear.

Here, a coupling portion 261 coupled to an upper end of the dash panel upper member 140 is formed to be bent forward at a lower end of the cowl panel 260, and the coupling portion 261 may extend forward with an inclination upward. In this manner, since the coupling portion 261 is bent and extends forward at the lower end of the cowl panel 260 and is in contact with the upper end of the dash panel upper member 140, coupling characteristics are improved. In particular, since the coupling portion 261 extends with an inclination upward, an angle is formed with respect to the dash panel upper member 140, improving assemblability. That is, when the upper assembly 200 is slidably assembled to the floor assembly 100 in the front-rear direction, the cowl panel 260 of the upper assembly 200 comes into contact with the dash panel upper member 140 of the floor assembly 100, and here, since the coupling portion 261 of the cowl panel 260 is inclined upward, jamming to the dash panel upper member 140 may be avoided to form a smooth assembly structure.

Meanwhile, as illustrated in FIGS. 9 and 10, the rear coupling portion 130 may include a vertical member 131 extending in the up-down direction from the rear of the floor 110 and a horizontal member 132 coupled to the vertical member 131 and extending in the front-rear direction, and the rear mounting portion 230 may include a connection member 231 coupled to the rear of the roof frame 210 and extending in the front-rear direction along the horizontal member 132. The horizontal member 132 and the connection member 231 may be connected in a slide coupling structure with respect to the front-rear direction.

Here, the vertical member 131, the horizontal member 132, and the connection member 231 may have a hollow closed cross-sectional structure to form a space frame structure. The vertical member 131 and the horizontal member 132 may be coupled to a wheel mounting portion 160 on which a wheel is mounted at the rear of the floor 110 to ensure strength and rigidity of the wheel mounting portion 160.

That is, the vertical member 131 extends in the up-down direction from the rear of the floor 110 to support each component including the upper assembly 200, and the horizontal member 132 is connected to the roof frame 210. Here, a rear portion 210b of the roof frame 210 provided at the upper assembly 200 may be configured as a C pillar, and a panel P connected to the wheel mounting portion 160 may be coupled thereto.

In particular, the rear mounting portion 230 of the upper assembly 200 is configured with the connection member 231 extending along the horizontal member 132. As such, the horizontal member 132 of the rear coupling portion 130 and the connection member 231 of the rear mounting portion 230 extend in the front-rear direction and are configured to be interconnected in a slide coupling structure with respect to the front-rear direction, whereby rear portions of the floor assembly 100 and the upper assembly 200 may be assembled to each other.

Specifically, as illustrated in FIG. 10, a second lower coupling portion S3 is provided at an upper end of the horizontal member 132 and a second upper coupling portion S4 engaged to be slidably coupled with the second lower coupling portion S3 is provided at a lower end of the connection member 231. The upper end of the horizontal member 132 and the lower end of the connection member 231 may be coupled to each other by the medium of the second lower coupling portion S3 and the second upper coupling portion S4, respectively, and the second lower coupling portion S3 and the second upper coupling portion S4 are engaged and slidably coupled in the front-rear direction.

Accordingly, one of the second upper coupling portion S4 and the second lower coupling portion S3 may be a protrusion having a polygonal, circular, or T-shaped cross-sectional shape, and the other may be configured as a recess slidably coupled to the corresponding protrusion.

Thus, since the second upper coupling portion S4 and the second lower coupling portion S3 are matched to each other and have the polygonal, circular, or T-shaped cross-sectional shape, movement is allowed only in the front-rear direction and is restricted in other directions. In embodiments of the present disclosure, the second upper coupling portion S4 and the second lower coupling portion S3 are assumed to have a T shape.

Accordingly, by matching and sliding the second upper coupling portion S4 of the connection member 231 in the front-rear direction with respect to the second lower coupling portion S3 of the horizontal member 132, the floor assembly 100 and the upper assembly 200 may be assembled to each other in a slide structure.

Here, the second upper coupling portion S4 may be configured as a plurality of recesses and the second lower coupling portion S3 may be configured as a plurality of protrusions inserted into the plurality of recesses. As such, since the second upper coupling portion S4 and the second lower coupling portion S3 are configured as a plurality of recesses and protrusions, coupling rigidity of the second upper coupling portion S4 and the second lower coupling portion S3 is increased. In addition, the rear coupling portion 130 and the rear mounting portion 230 for assembling the rear portions of the floor assembly 100 and the upper assembly 200 secure an installation space in comparison with the front portion 210a, it is easy to configure the second upper coupling portion S4 and the second lower coupling portion S3 as the plurality of recesses and protrusions.

Meanwhile, as illustrated in FIG. 11, the floor assembly 100 includes a pillar coupling portion 150 provided between the front coupling portion 120 and the rear coupling portion 130 at the floor 110, the upper assembly 200 includes a pillar mounting portion 270 provided between the front mounting portion 220 and the rear mounting portion 230 at the roof frame 210, and a center pillar member 300 extending in an up-down direction may be coupled to the pillar coupling portion 150 and the pillar mounting portion 270.

Here, the center pillar member 300 corresponds to a B pillar and is connected to the floor 110 and the roof frame 210 to extend to traverse in the up-down direction. In order to fix the center pillar member 300, the floor 110 has the pillar coupling portion 150 provided between the front coupling portion 120 and the rear coupling portion 130, and the roof frame 210 has the pillar mounting portion 270 provided between the front mounting portion 220 and the rear mounting portion 230. In addition, the center pillar member 300 may be bolted and adhered to the pillar coupling portion 150 and the pillar mounting portion 270, and thus may be easily modified and applied to various vehicle types and models.

Figure 12:
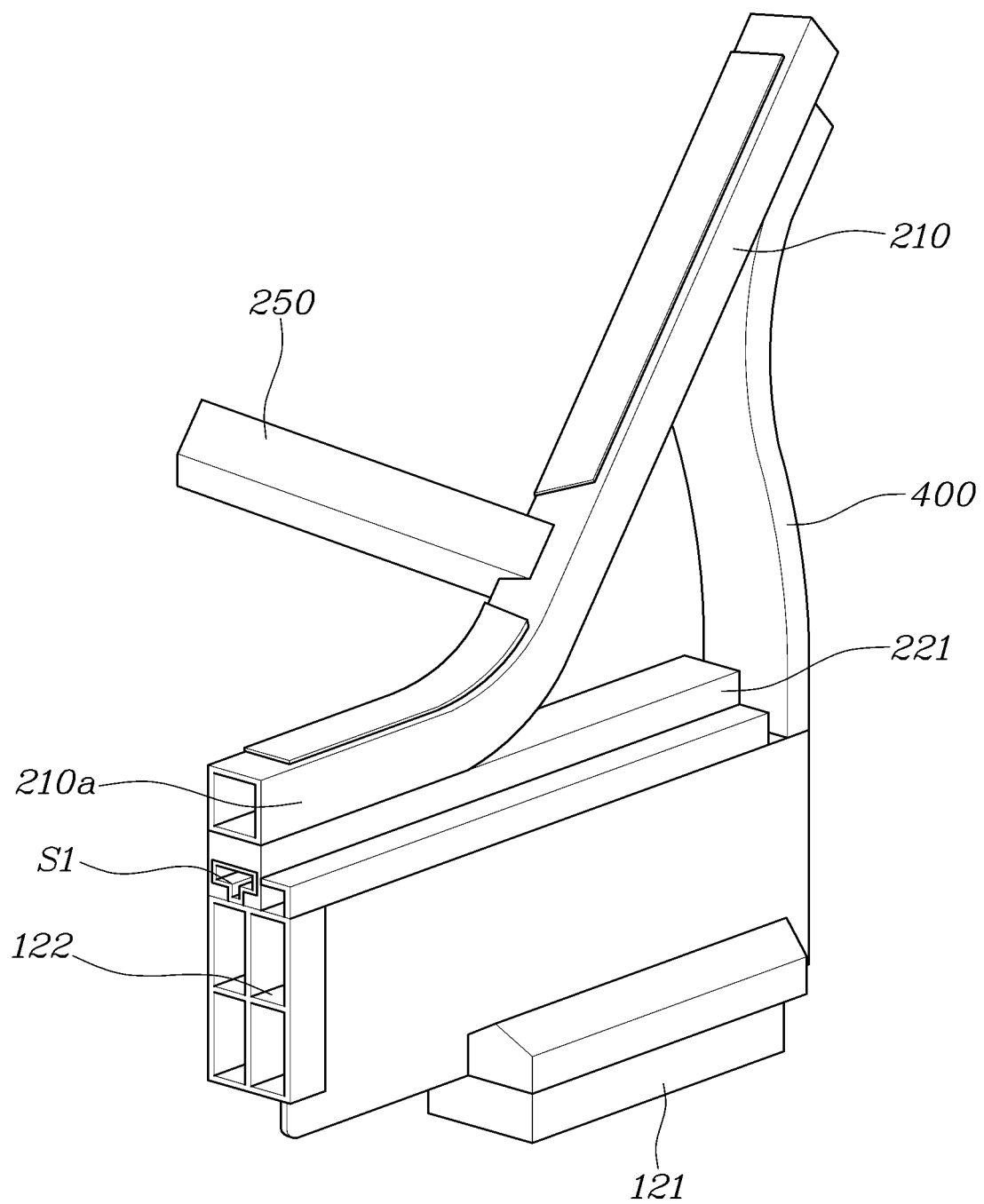
FIGS. 12 through 17 are views illustrating a vehicle body assembly structure according to embodiments of the present disclosure.
Figure 13:
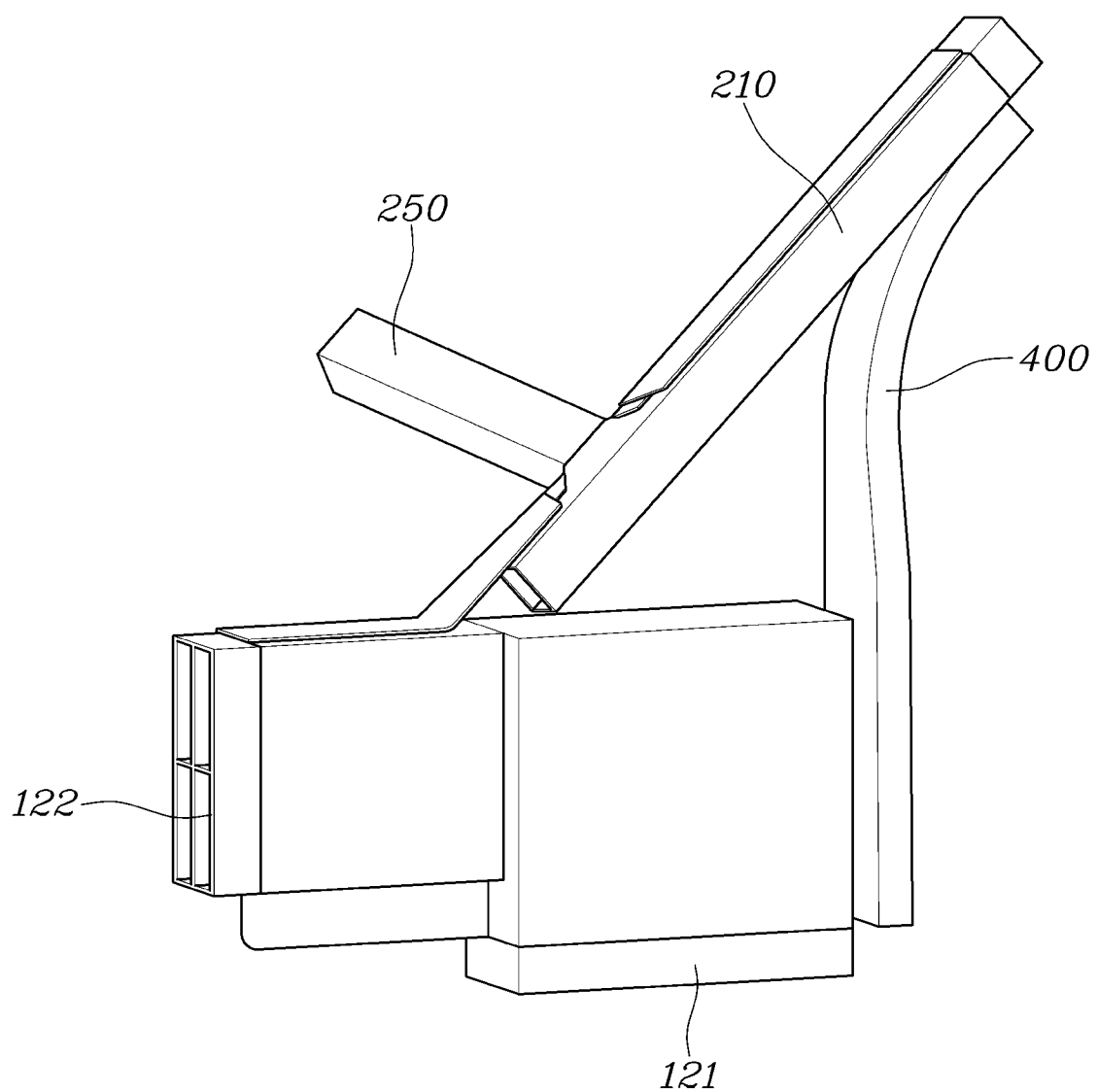
Figure 14:
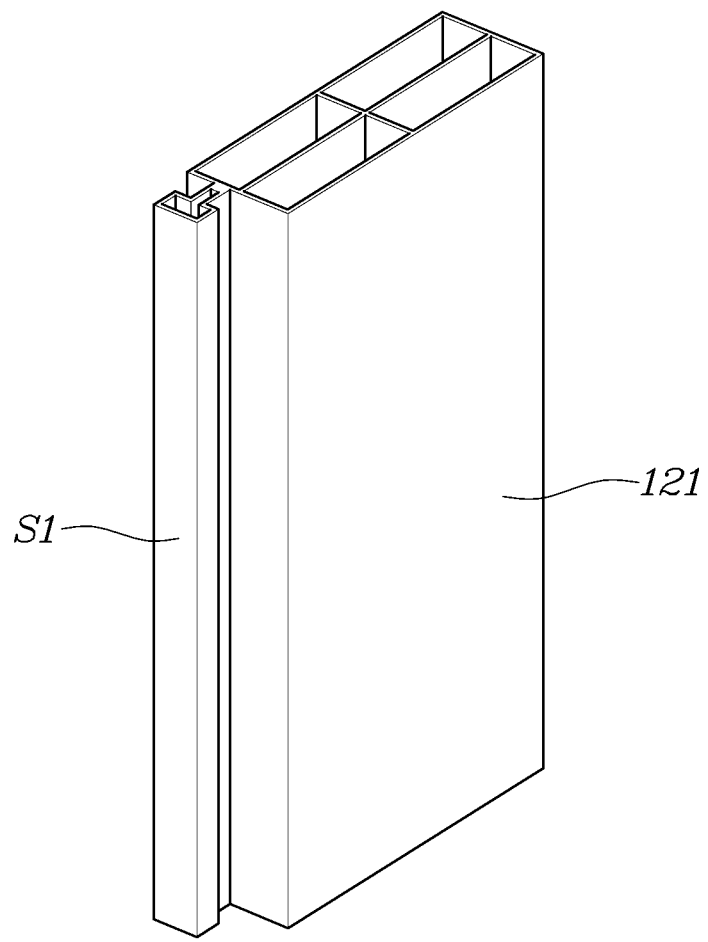
Figure 15:
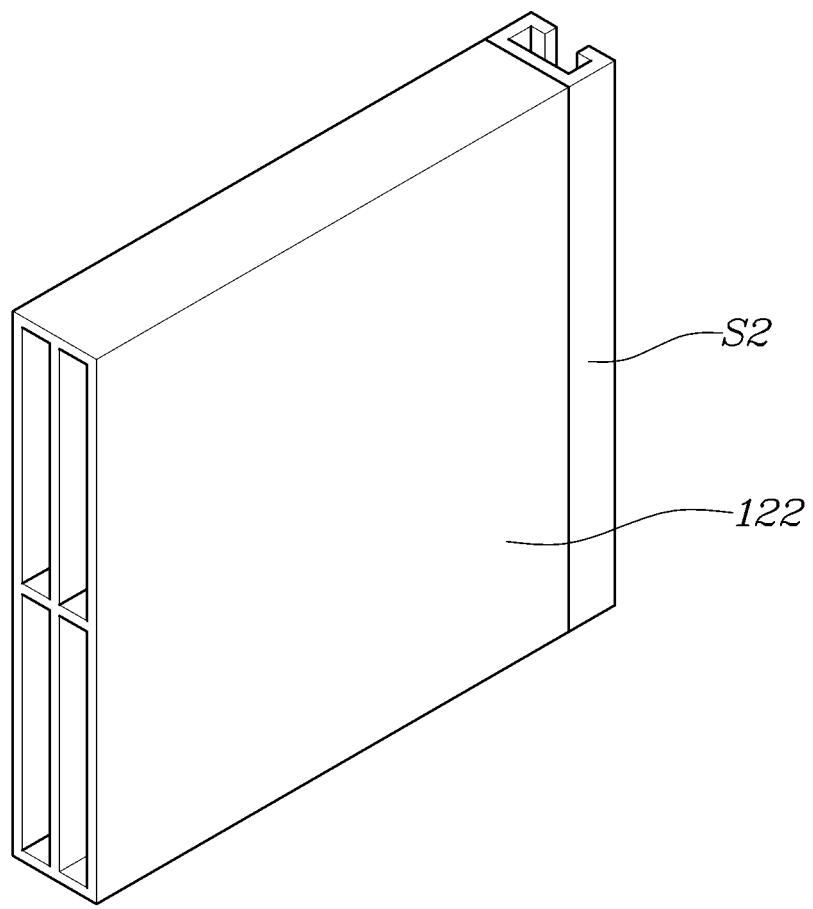
Figure 16:
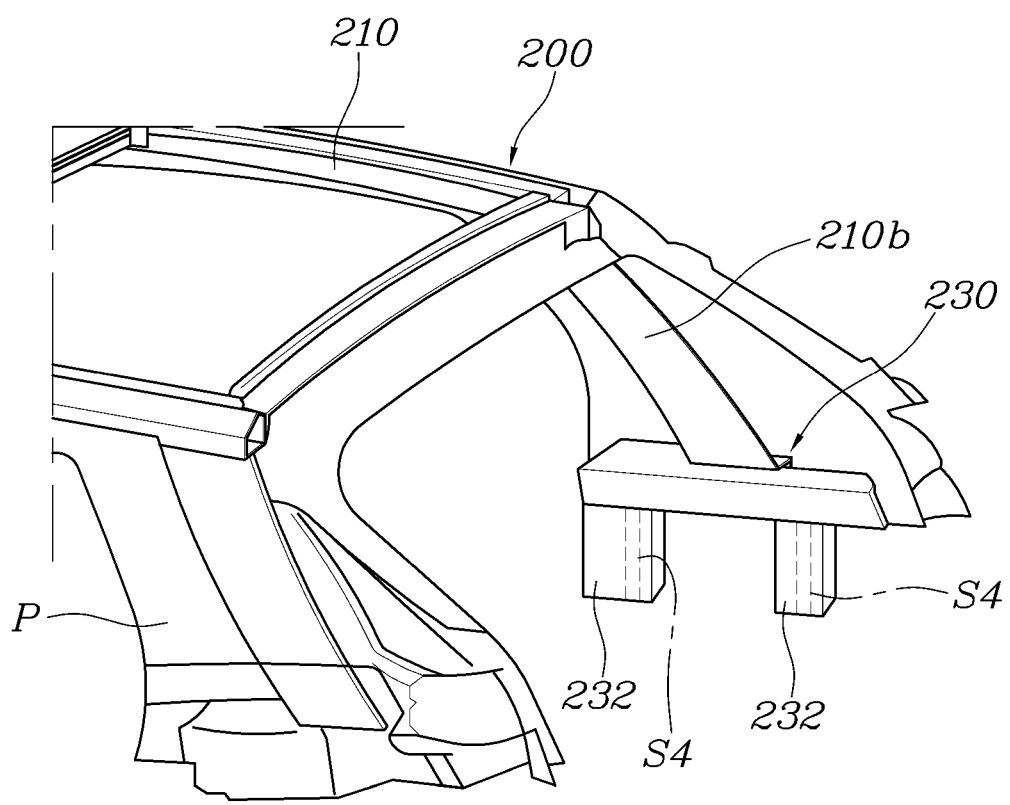
Figure 17:
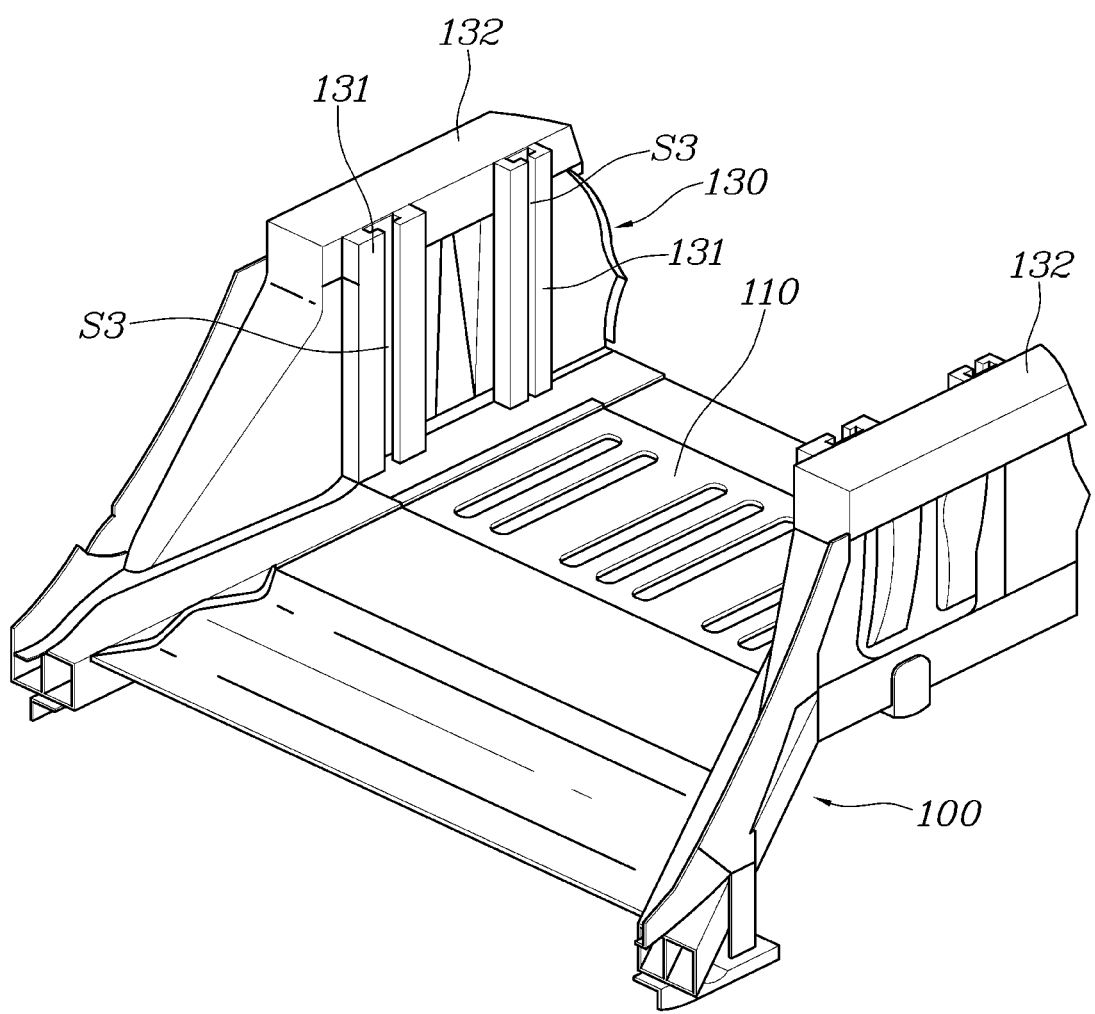

Meanwhile, as illustrated in FIG. 12, the lower pillar member 121 and the middle member 122 of the front coupling portion 120 and the roof frame 210 and the middle member upper 221 of the front mounting portion 220 may be enclosed in an inner cover bracket 400 so as to be fixed together. As such, the lower pillar member 121, the middle member 122, the roof frame 210, and the middle member upper 221 are connected to each other through the inner cover bracket 400, thereby ensuring the coupling rigidity and strength of each member and the frame. In addition, the inner cover bracket 400 is formed of a rigid material to ensure the coupling strength of the connection portion of each member and the frame. To ensure durability of the vehicle body, the shape may be modified according to various vehicle types and models. This is suitable to be applied to miniaturized vehicle types and models, and the support member 240 described above may be applied together in a case where high rigidity is required.

In addition, an outer cover bracket (not shown) may be mounted outside the inner cover bracket 400 to enclose the lower pillar member 121 and the middle member 122 of the front coupling portion 120 and the roof frame 210 and the middle member upper 221 of the front mounting portion 220 together with the inner cover bracket 400.

Meanwhile, as illustrated in FIGS. 13 through 17, the front coupling portion 120 may include the lower pillar member 121 extending in the up-down direction on the front of the floor 110, the front mounting portion 220 includes the middle member 122 coupled to the roof frame 210 and extending in the front-rear direction from the lower portion of the roof frame 210, and the lower pillar member 121 and the middle member 122 may be coupled in a slide structure in the up-down direction when assembled.

As such, since the front coupling portion 120 includes the lower pillar member 121 extending in the up-down direction at the front of the floor 110 and the front mounting portion 220 includes the middle member 122 coupled to the roof frame 210 and extending in the front-rear direction from the lower portion of the roof frame 210, the front coupling portion 120 and the front mounting portion 220 are assembled in the up-down direction.

Here, the lower pillar member 121 of the front coupling portion 120 and the middle member 122 and the roof frame 210 of the front mounting portion 220 are enclosed in the inner cover bracket 400 so as to be fixed together, and when the lower pillar member 121 is inserted into the inner cover bracket 400, the lower pillar member 121 may be coupled to the middle member 122 in a slide structure in the up-down direction. Although not shown, an outer cover bracket (not shown) may be mounted outside the inner cover bracket 400 to enclose the lower pillar member 121, the middle member 122, and the roof frame 210.

The front coupling portion 120 includes the lower pillar member 121 at the front of the floor 110, the front mounting portion 220 includes the roof frame 21 and the middle member 122, and the roof frame 210 and the middle member 122 are coupled through the inner cover bracket 400. Here, the roof frame 210 is disposed above the inner cover bracket 400, and the lower pillar member 121 and the middle member 122 are disposed below the roof frame 210 so that the inner cover bracket 400 is formed to enclose the roof frame 210, the lower pillar member 121, and the middle member 122 and is formed to be open so that the lower pillar member 121 is inserted into the rear of the middle member 122. Accordingly, when the lower pillar member 121 is inserted into an open portion of the inner cover bracket 400, the lower pillar member 121 is in contact with the rear of the middle member 122 and the front coupling portion 120 and the front mounting portion 220 are assembled in the up-down direction.

To this end, the first lower coupling portion S1 is formed at the front end of the lower pillar member 121, and the first upper coupling portion S2 engaged with and slidably coupled to the first lower coupling portion S1 may be provided at the rear end of the middle member 122.

That is, the front end of the lower pillar member 121 and the rear end of the middle member 122 may be coupled by the medium of the first lower coupling portion S1 and the first upper coupling portion S2. The first lower coupling portion S1 and the first upper coupling portion S2 are engaged and slidably coupled with each other in the up-down direction and slide to engage each other. Here, one of the first upper coupling portion S2 and the first lower coupling portion S1 may be a protrusion having a polygonal, circular, or T-shaped cross-sectional shape, and the other may be configured as a recess slidably coupled to the corresponding protrusion.

Accordingly, by matching and sliding the first upper coupling portion S2 of the middle member 122 in the up-down direction with respect to the first lower coupling portion S1 of the lower pillar member 121, the floor assembly 100 and the upper assembly 200 may be assembled to each other in a slide structure.

Meanwhile, the rear coupling portion 130 may include the vertical member 131 extending in the up-down direction at the rear of the floor 110 and the horizontal member 132 coupled to the vertical member 131 and extending in the front-rear direction. The rear mounting portion 230 includes a coupling member 232 coupled to the rear of the roof frame 210 and extending downward along the vertical member 131, and the vertical member 131 and the coupling member 232 may be connected in the up-down direction in the slide coupling structure.

The vertical member 131 may extend in the up-down direction at the rear of the floor 110 to support each component including the upper assembly 200, and the horizontal member 132 is connected to the roof frame 210. Here, the rear portion of the roof frame 210 provided at the upper assembly 200 may be configured as a C pillar, and the panel P connected to the wheel mounting portion 160 may be coupled thereto.

In particular, the rear mounting portion 230 of the upper assembly 200 is configured with the coupling member 232 extending along the vertical member 131. As such, since the vertical member 131 of the rear coupling portion 130 and the coupling member 232 of the rear mounting portion 230 extend in the up-down direction and are interconnected in the slide coupling structure with respect to the up-down direction, the rear portions of the floor assembly 100 and the upper assembly 200 may be assembled to each other.

Here, the second lower coupling portion S3 may be provided at the vertical member 131, and the second upper coupling portion S4 engaged with and slidably coupled to the second lower coupling portion S3 may be provided at the coupling member 232. In this manner, the vertical member 131 and the coupling member 232 may be coupled by the medium of the second lower coupling portion S3 and the second upper coupling portion S4, and the second upper coupling portion S4 and the second lower coupling portion S3 are engaged with and slidably coupled to each other in the up-down direction. Accordingly, one of the second upper coupling portion S4 and the second lower coupling portion S3 may be a protrusion having a polygonal, circular, or a T-shaped cross-sectional shape, and the other may be configured as a recess slidably coupled to the corresponding protrusion.

Thus, by matching and sliding the second upper coupling portion S4 of the coupling member in the up-down direction with respect to the second lower coupling portion S3 of the vertical member 131, the floor assembly 100 and the upper assembly 200 may be assembled to each other in the slide structure.

In the vehicle body assembly structure having the structure as described above, the vehicle body is separated into the floor assembly 100 and the upper assembly 200, and each assembly may be easily and commonly applied through the connection structure of the pillar connecting each separated assembly, whereby assemblability of the components may be ensured and strength and rigidity of the components may be improved.

Although the present disclosure has been illustrated and described with respect to specific embodiments, it will be apparent to those having ordinary skill in the art that the present disclosure may be variously modified and altered without departing from the spirit and scope of the present disclosure as defined by the following claims.

What is claimed is:

1. A vehicle body assembly structure comprising:
 a floor assembly including a floor, a front coupling portion provided at a front of the floor, and a rear coupling portion provided at a rear of the floor; and
 an upper assembly including a roof frame, a front mounting portion matched to the front coupling portion at a front of the roof frame, and a rear mounting portion matched to the rear coupling portion at a rear of the roof frame,
 wherein each of the front coupling portion and the front mounting portion and the rear coupling portion and the rear mounting portion are connected in a slide coupling structure;
 wherein the front coupling portion includes a lower pillar member extending in an up-down direction on the front of the floor;

wherein the front mounting portion includes a middle member coupled to the roof frame and extending in a front-rear direction from a lower portion of the roof frame;

wherein the lower pillar member and the middle member are coupled in a slide structure in the up-down direction when assembled;

wherein a first lower coupling portion is provided at a front end of the lower pillar member; and wherein a first upper coupling portion engaged with and slidably coupled to the first lower coupling portion is provided at a rear end of the middle member.

2. The vehicle body assembly structure of claim 1, wherein:

the floor assembly includes a pillar coupling portion provided between the front coupling portion and the rear coupling portion at the floor;

the upper assembly includes a pillar mounting portion provided between the front mounting portion and the rear mounting portion at the roof frame; and a center pillar member extending in an up-down direction is coupled to the pillar coupling portion and the pillar mounting portion.

3. The vehicle body assembly structure of claim 1, wherein the lower pillar member, the middle member, and the roof frame are enclosed in an inner cover bracket and fixed together.

4. The vehicle body assembly structure of claim 1, wherein:

the rear coupling portion includes a vertical member extending in an up-down direction at the rear of the floor and a horizontal member coupled to the vertical member and extending in a front-rear direction;

the rear mounting portion includes a coupling member coupled to the rear of the roof frame and extending downward along the vertical member; and the vertical member and the coupling member are connected in the up-down direction in the slide coupling structure.

5. The vehicle body assembly structure of claim 4, wherein:

a second lower coupling portion is provided at the vertical member; and a second upper coupling portion engaged with and slidably coupled to the second lower coupling portion is provided at the coupling member.

6. A vehicle body assembly structure comprising:

a floor;

a front coupling portion that includes a lower pillar member extending in an up-down direction at the front of the floor and a middle member coupled to the lower pillar member and extending forward;

a rear coupling portion provided at a rear of the floor;

a roof frame;

a front mounting portion matched to the front coupling portion at a front of the roof frame, wherein the front mounting portion includes a middle member upper coupled to the front of the roof frame and extending forward along the middle member and wherein the middle member and the middle member upper are connected in a slide coupling structure with respect to a front-rear direction; and a rear mounting portion matched to the rear coupling portion at a rear of the roof frame, wherein each of the front coupling portion and the front mounting portion and the rear coupling portion and the rear mounting portion are connected in a slide coupling structure.

7. The vehicle body assembly structure of claim 6, wherein:

a first lower coupling portion is provided at an upper end of the middle member; and a first upper coupling portion engaged with and slidably coupled to the first lower coupling portion is provided at a lower end of the middle member upper.

8. The vehicle body assembly structure of claim 7, wherein one of the first upper coupling portion and the first lower coupling portion is a protrusion having a polygonal, circular, or T-shaped cross-sectional shape, and the other is a recess slidably coupled to the protrusion.

9. The vehicle body assembly structure of claim 7, wherein:

a panel portion extending upward from a side end is provided at the upper end of the middle member;

the first lower coupling portion is provided toward the middle member upper at the upper end of the middle member and at the panel portion; and the first upper coupling portion engaged with the first lower coupling portion provided at each of the upper end of the middle member and at the panel portion is provided at the lower end of the middle member upper and a side end of the middle member upper facing the panel portion.

10. The vehicle body assembly structure of claim 9, wherein:

a fastening end portion in which the first upper coupling portion is provided protrudes from each of the lower end of the middle member upper and the side end of the middle member upper facing the panel portion; and a support end portion protruding to fill a space between the fastening end portions in a state where the first upper coupling portion of the middle member upper is engaged with the first lower coupling portion is provided at the upper end of the middle member.

11. The vehicle body assembly structure of claim 6, wherein a front portion of the roof frame is coupled with an inclination at an upper portion of the middle member upper, and a support member coupling the front portion of the roof frame and the middle member upper is provided between the front portion of the roof frame and the middle member upper.

12. The vehicle body assembly structure of claim 6, further comprising:

a dash panel upper member extending in a transverse direction of a vehicle and connected to the lower pillar member;

a cowl member extending in the transverse direction of the vehicle at a front portion of the roof frame; and a cowl panel with an upper end connected to the cowl member and lower end is connected to the dash panel upper member.

13. The vehicle body assembly structure of claim 12, wherein a coupling portion bent forward and coupled to an upper end of the dash panel upper member is provided at a lower end of the cowl panel, and the coupling portion extends forward with an inclination upward.

14. The vehicle body assembly structure of claim 6, wherein the lower pillar member and the middle member of the front coupling portion and the roof frame and the middle member upper of the front mounting portion are enclosed in an inner cover bracket so as to be fixed together.

15. A vehicle body assembly structure comprising:
a floor assembly including a floor, a front coupling portion provided at a front of the floor, and a rear coupling portion provided at a rear of the floor; and
an upper assembly including a roof frame, a front mounting portion matched to the front coupling portion at a front of the roof frame, and a rear mounting portion matched to the rear coupling portion at a rear of the roof frame;
wherein each of the front coupling portion and the front mounting portion and the rear coupling portion and the rear mounting portion are connected in a slide coupling structure;
wherein the rear coupling portion includes a vertical member extending in an up-down direction from the rear of the floor and a horizontal member coupled to the vertical member and extending in a front-rear direction;
wherein the rear mounting portion includes a connection member coupled to the rear of the roof frame and extending in the front-rear direction along the horizontal member; and
wherein the horizontal member and the connection member are connected in a slide coupling structure with respect to the front-rear direction:
wherein a second lower coupling portion is provided at an upper end of the horizontal member; and
wherein a second upper coupling portion engaged to be slidably coupled with the second lower coupling portion is provided at a lower end of the connection member.

16. The vehicle body assembly structure of claim 15, wherein one of the second upper coupling portion and the second lower coupling portion is a protrusion having a polygonal, circular, or T-shaped cross-sectional shape, and the other is a recess slidably coupled to the protrusion.

17. The vehicle body assembly structure of claim 16, wherein the second upper coupling portion is configured as a plurality of recesses and the second lower coupling portion is configured as a plurality of protrusions inserted into the plurality of recesses.

18. The vehicle body assembly structure of claim 2, wherein the lower pillar member, the middle member, and the roof frame are enclosed in an inner cover bracket and fixed together.

19. The vehicle body assembly structure of claim 2, wherein:
the rear coupling portion includes a vertical member extending in an up-down direction at the rear of the floor and a horizontal member coupled to the vertical member and extending in a front-rear direction;
the rear mounting portion includes a coupling member coupled to the rear of the roof frame and extending downward along the vertical member; and
the vertical member and the coupling member are connected in the up-down direction in the slide coupling structure.

20. The vehicle body assembly structure of claim 19, wherein the lower pillar member, the middle member, and the roof frame are enclosed in an inner cover bracket and fixed together.

* * * * *